US008798529B2

(12) United States Patent
Timmins et al.

(10) Patent No.: US 8,798,529 B2
(45) Date of Patent: Aug. 5, 2014

(54) METHOD AND APPARATUS FOR ENHANCING WIRELESS COMMUNICATIONS TO AND FROM THE INSIDE OF A BUILDING

(75) Inventors: Ian J. Timmins, Asheville, NC (US); James Yanik, Asheville, NC (US); Sterling Vaden, Black Mountain, NC (US); Sumio Seo, South Wallingford, VT (US)

(73) Assignee: Optical Cable Corporation, Roanoke, VA (US)

( * ) Notice: Subject to any disclaimer, the term of this patent is extended or adjusted under 35 U.S.C. 154(b) by 670 days.

(21) Appl. No.: 13/099,483

(22) Filed: May 3, 2011

(65) Prior Publication Data

US 2011/0275400 A1 Nov. 10, 2011

Related U.S. Application Data

(60) Provisional application No. 61/331,434, filed on May 5, 2010.

(51) Int. Cl.

| | |
|---|---|
| ***H04B 7/14*** | (2006.01) |
| ***H04B 3/58*** | (2006.01) |
| ***H01Q 1/00*** | (2006.01) |
| ***H01Q 21/28*** | (2006.01) |

(52) U.S. Cl.

CPC ............... *H01Q 1/007* (2013.01); *H01Q 21/28* (2013.01)

USPC ................................. 455/15; 455/14; 455/16

(58) Field of Classification Search

CPC .. H01Q 1/242; H04B 5/0018; H04B 17/0042; H04B 17/0057; H04B 17/0065; H04B 17/0097; H04B 7/15; H04B 17/006; H04B 7/18508; H04B 7/2606; H04B 17/0085; H04B 1/04; H04B 1/40; H04B 1/713

USPC ...................... 455/7, 14, 15, 16, 562.1, 575.1

See application file for complete search history.

(56) References Cited

U.S. PATENT DOCUMENTS

| | | | | |
|---|---|---|---|---|
| 1,989,466 | A | 5/1929 | Satterlee et al. | |
| 4,198,624 | A * | 4/1980 | Watanabe | 340/505 |
| 4,401,989 | A | 8/1983 | Tulli | |

(Continued)

FOREIGN PATENT DOCUMENTS

| | | |
|---|---|---|
| WO | WO 02/065229 | 8/2002 |
| WO | WO 2008/009968 | 1/2008 |

OTHER PUBLICATIONS

PCT International Preliminary Report on Patentability and Written Opinion of the International Searching Authority; Mar. 29, 2011.

*Primary Examiner* — Ping Hsieh
*Assistant Examiner* — Xin Jia
(74) *Attorney, Agent, or Firm* — The Van Winkle Law Firm; David M. Carter

(57) ABSTRACT

An apparatus for enhancing wireless communications to and from a building is provided. A first antenna associated with the building for sending and receiving wireless signals to and from a wireless signal transponder located remote from the building and a signal path interface are provided. A first signal path is located between the first antenna and the signal path interface. The building includes a wiring system. At least a second signal path is located between the signal path interface and the wiring system. At least a portion of the wiring system is a second antenna for sending and receiving wireless signals to and from wireless devices located within the building.

16 Claims, 3 Drawing Sheets

(56) References Cited

U.S. PATENT DOCUMENTS

| | | | | | |
|---|---|---|---|---|---|
| 5,329,576 | A * | 7/1994 | Handforth | ..................... | 455/410 |
| 5,832,364 | A | 11/1998 | Gustafson | | |
| 6,115,604 | A | 9/2000 | Lester et al. | | |
| 6,243,571 | B1 | 6/2001 | Bullock et al. | | |
| 6,778,817 | B1 | 8/2004 | Bullock et al. | | |
| 7,690,949 | B2 | 4/2010 | Binder | | |
| 2008/0298762 | A1* | 12/2008 | Hawley et al. | ................ | 385/135 |
| 2010/0080203 | A1* | 4/2010 | Reynolds et al. | ............. | 370/338 |

* cited by examiner

METHOD AND APPARATUS FOR ENHANCING WIRELESS COMMUNICATIONS TO AND FROM THE INSIDE OF A BUILDING

RELATIONSHIP TO PRIOR APPLICATION

This is a U.S. non-provisional application relating to and claiming the benefit of U.S. Provisional Patent Application Ser. No. 61/331,434, filed May 5, 2010.

BACKGROUND

This invention relates to wireless communication systems, more particularly, it relates to a method and apparatus for enhancing wireless communications to and from the inside of a building.

The demand for wireless communications has grown substantially over the past few years, primarily because it enables users to communicate over a wide range of locations. This demand has been met in part by the placement of numerous cellular towers around the country. However, wireless communication within a building often does not work well, notwithstanding the existence of numerous towers outside of the building. One problem encountered by wireless communication systems within a building is the obstruction of and interference with the wireless signal. Physical structures, such as concrete block walls, metal covered wall insulation, and electromagnetic devices such as cordless phones and microwave ovens, can cause a wireless signal to fade.

U.S. Pat. No. 7,406,300 to Pan notes the popularity and increased capability of wireless communication apparatus, noting that such apparatus offer voice, data and video communication capabilities to cell phones, personal digital assistants and lap top computers that are carried by individuals. However, according to the Pan patent, one limitation on such communications has been the difficulty in obtaining signal within a structure such as a residential home, for example. Among the factors contributing to this difficulty is the inherently limited radio frequency (RF) coverage in and around building structures on account of the metallic content of a building structure that can provide an RF block or otherwise interfere with adequate signal transmission. For example, the siding on the exterior of the building, the insulation, or window treatments may include metal or foil, which inhibits propagation and reduces RF coverage within the building structure. Additionally, the various metal objects and the structure of the internal walls, for example, in many cases prevent adequate interior RF coverage so that individually carried cell phones, personal digital assistants and lap top computers cannot consistently receive or transmit a signal at the full range of desired user locations within the building structure.

One known technique for providing RF coverage within buildings calls for a repeater antenna to be located on a suitable signal reception area such as a rooftop or tower. The repeater captures an outside RF signal, boosts the signal, and directs the boosted signal towards buildings. However, the metallic content of a building structure may interfere with the directed RF signal. The resulting coverage within the building is thus unpredictable. Factors such as a call location inside the building, the building location relative to the serving base station location, building construction, repeater site location, and orientation of the repeater antennas can influence and render unpredictable the RF signal capability within the building.

Another known technique for providing RF coverage within buildings calls for inside and outside repeater antennas to bypass building penetration losses, uses an outside antenna to capture macrocell RF signals, a coax cable to bypass building penetration losses, a repeater for signal boosting, and one or more inside antennas to create inside RF coverage where desired. The outside antenna may be installed on a rooftop pointing at the serving macrocell, a long coax cable connected to the outside antenna brings the RF signal inside, and a repeater boosts the signal and feeds one or more inside antennas. The set up of a dedicated network of inside antennas involves the installation of cabling and associated hardware and this can amount to an overly expensive approach for improving RF signal coverage within a building.

Thus, there is a need for an improved method and apparatus for enhancing wireless communications within a building. Such an improved method and apparatus will preferably provide RF coverage within a building structure facilitating communication between an external RF source and wireless communication apparatus such as cell phones, personal digital assistants and lap top computers that are carried by individuals or any other wireless communications between a mobile user inside a building and a provider tower outside.

U.S. Pat. No. 8,325,691, issued Dec. 4, 2012 and assigned to Optical Cable Corporation, which is the assignee of this application, is directed to a method and apparatus for providing wireless communications within a building which overcomes many of the problems referred to above. The teachings of U.S. Pat. No. 8,325,691 are hereby incorporated herein by reference.

The '691 patent teaches the placement of a small antenna associated with or attached to faceplates within a building. For example, four antenna faceplate combinations may be placed within a building. A coaxial splitter and a bi-directional amplifier are provided. The main outside antenna is connected to the bi-directional amplifier which in turn is connected to one side of the splitter. The small antennas associated with the faceplates are connected to the other side of the splitter. While this system works well within a building, it requires installation of coaxial cable from the splitter to the small antennas. In addition, it requires the construction of the small antennas, all of which increases the cost of the system.

SUMMARY OF THE INVENTION

As used herein, the term "building" means any enclosed space, such as a building as normally understood, a mine, a ship or a parking garage.

In accordance with one form of this invention, there is provided an apparatus for enhancing wireless communications to and from the inside of a building. A first antenna associated with the building is provided for sending and receiving wireless signals to and from a cell tower. A bi-directional amplifier is provided and is connected to the first antenna by a first coaxial cable. A coaxial splitter is provided and is connected to the bi-directional amplifier by a second coaxial cable. A third and a fourth coaxial cable and a coaxial cable/patch cord interface device are provided. The interface device has at least first and second coaxial connectors and at least first and second jacks mounted thereon. The third and fourth coaxial cables connect the splitter to the first and second coaxial connectors mounted on the interface device. First and second patch cords and a patch panel are provided. The first and second patch cords are connected to the first and second jacks mounted on the interface device and connect the interface device to the patch panel. A wiring system associated with the building is provided. A plurality of wall outlets is provided. The wiring system connects the patch panel to the wall outlets. At least a portion of the wiring system forms a second antenna for receiving and sending wireless signals to and from wireless devices located within the building.

In accordance with another form of this invention, there is provided an apparatus for enhancing wireless communication to and from the inside of a building. A first antenna associated with the building for sending and receiving wireless signals to and from a wireless signal transponder located remote from the building is provided. A signal path interface is provided. A first signal path is located between the first antenna and a signal path interface. A wiring system associated with the building is provided. At least a second signal path is provided between the signal path interface and the wiring system. At least a portion of the wiring system operates as a second antenna for sending and receiving wireless signals to and from wireless devices located within the building.

In accordance with yet another form of this invention, there is provided a method for enhancing wireless communications to and from the inside of a building. A first wireless signal is received by a first antenna from a wireless transponder remotely located from the building. The first signal received by the first antenna is amplified and conveyed to a second antenna which includes at least a portion of the wiring system of the building. The amplified first signal from the second antenna is sent to a wireless device located within the building. A second wireless signal is transmitted from the wireless device. The second wireless signal is received by the second antenna. The second signal received by the second antenna is amplified and is sent to the first antenna which sends the second signal to the wireless transponder.

BRIEF DESCRIPTION OF THE DRAWINGS

The subject matter which is regarded as the invention is set forth in the independent claims. The invention, however, may be better understood in reference to the accompanying drawings in which:

DESCRIPTION OF THE PREFERRED EMBODIMENT

Essentially, this invention eliminates the need for the small antennas associated with the faceplates and the long runs of coaxial cable to those faceplates which is taught in U.S. Pat. No. 8,325,691 referred to above. This invention takes advantage of existing communication wiring which is already in a building, to act as antenna for sending and receiving wireless signals, such as cellular telephone signals, which originate within the building. In addition, patch cord(s) is used to connect from a patch panel, which is also already in the building, to a device which interfaces with coaxial cable, which ultimately is connected to the standard antenna, which is preferably located outside of the building, through a bi-directional amplifier. This patch cord(s) also cooperates with the existing wiring in the building to form a part of an interior antenna for sending and receiving wireless signals within the building.

Figure 1:
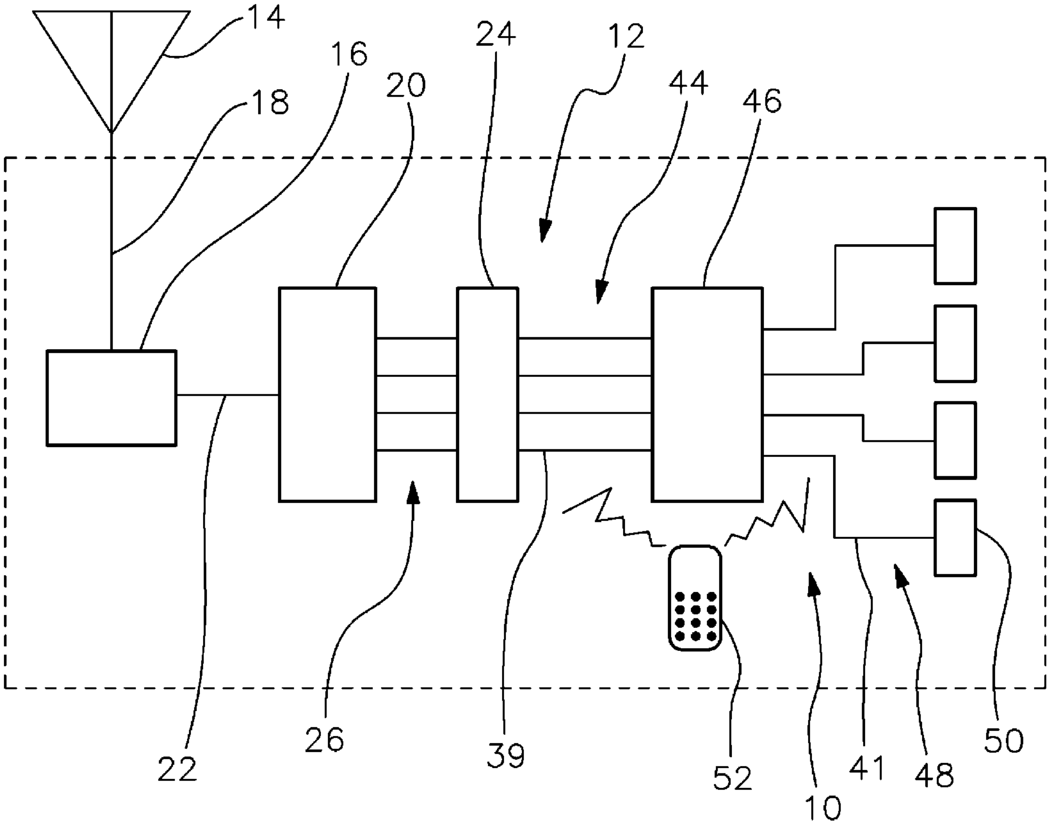
FIG. 1 is a schematic diagram illustrating one embodiment of the subject invention.
Figure 2:
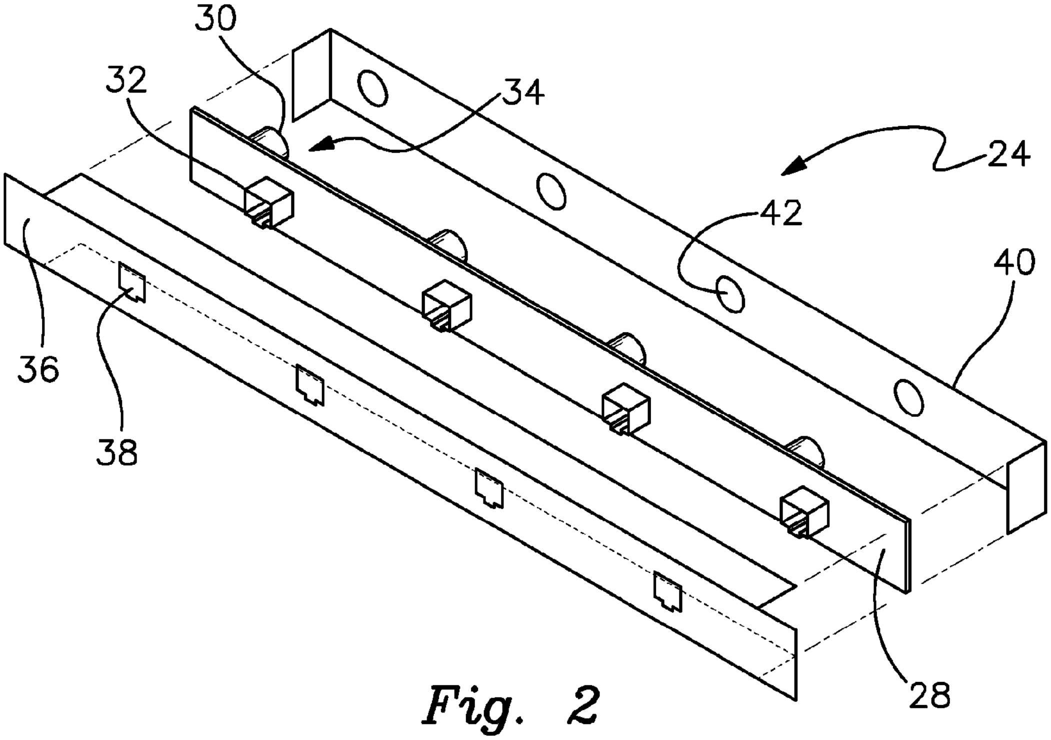
FIG. 2 is an exploded view of the coaxial cable/patch cord interface of FIG. 1.
Figure 3:
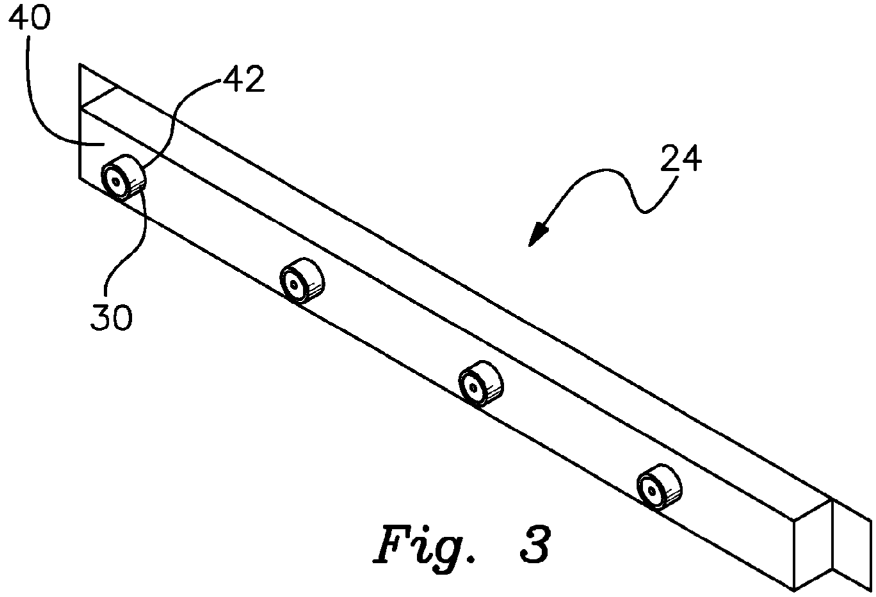
FIG. 3 is a perspective view of the apparatus of FIG. 2 fully assembled but rotated 180 degrees.

Referring now more particularly to FIG. 1, a building is illustrated by dashed line 10. The improved apparatus for enhancing wireless communications within building 10 is illustrated by schematic block diagram 12. Standard cellular telephone antenna 14 known to those skilled in the art, is preferably located outside of building 10 and is adapted to communicate with a transponder on a cellular tower (not shown). Antenna 14 is connected by coaxial cable 18 to bi-directional amplifier or repeater 16, known to those skilled in the art, such as a model CM 800 bi-directional amplifier commercially available from the Cellphone-Mate Company. Bi-directional amplifier 16 is connected to one to four cable splitter 20 by coaxial cable 22. Coaxial cable/patch cord interface 24, which is described below, is connected to coaxial splitter 20 by four coaxial cables 26. Coaxial cable/patch cord interface 24 is specifically illustrated in FIGS. 2-5. Coaxial cable/patch cord interface 24 includes circuit board 28 having a plurality of RF N-type coaxial connectors 30 mounted to one side of circuit board 28 and a plurality of RJ45 jacks 32 mounted to the other side of circuit board 28. Coaxial cable/patch cord interface 24 forms a signal path interface. The connections and apparatus located between antenna 14 and interface 24 form a first signal path.

Figure 4:
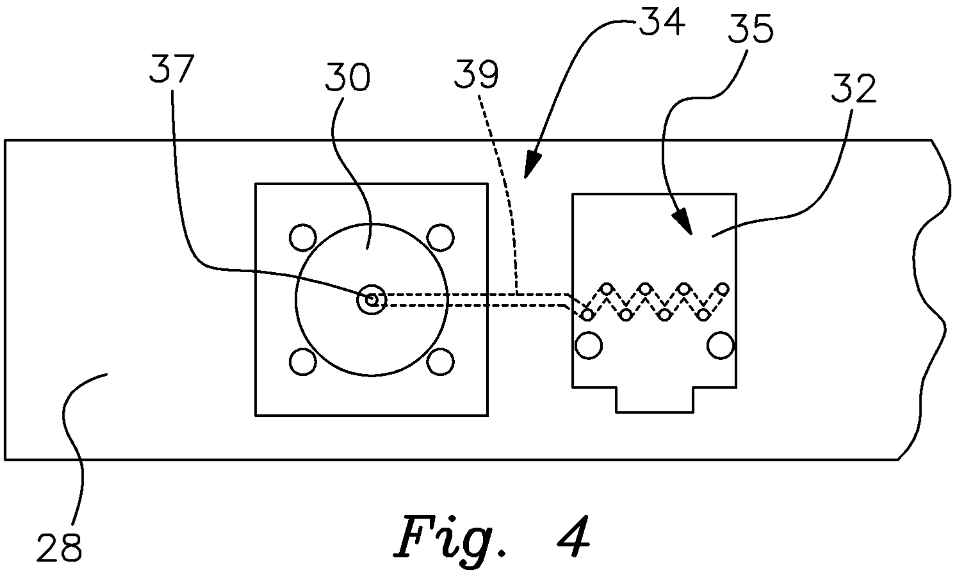
FIG. 4 is top view of a portion of circuit board 28 shown in FIG. 2.
Figure 5:
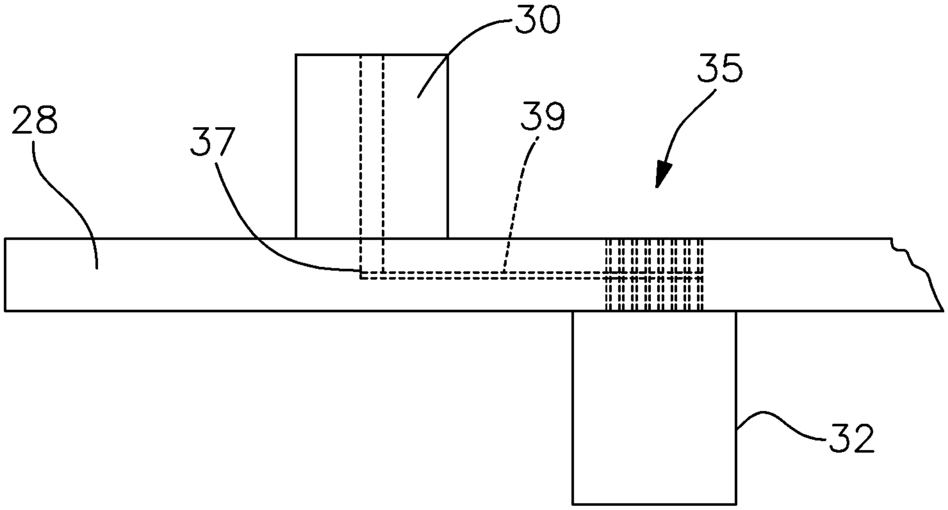
FIG. 5 is a side view of the apparatus of FIG. 4.

In this embodiment, there are four RF N-type coaxial connectors and four RJ45 jacks connected to circuit board 28, thereby forming four associated pairs of jacks and N-type connectors, such as associated pair 34. Each jack and N-type connector of a pair is wired together. FIGS. 4 and 5 show only a portion of circuit board 28 with a single associated jack/N-type connector pair 34 being shown. Board 28 also includes three additional jack/N-type connector pairs. The additional three pairs may be identical to connector pair 34. As can be seen in FIGS. 4 and 5, the eight contacts 35 of jack 32 and the center conductor 37 of N-type connector 30 of a pair, such as pair 34, are connected together through conductive trace 39 on or in board 28. Preferably, board 28 is a multi-layered board and trace 39 is inside the board. By connecting all eight conductors 35 of jack 32 together, all of the circuits associated with the eight conductors are effectively shorted out. Thus, all of the circuit paths associated with patch cord 39, including any of the building wiring circuits 48 which are associated with patch cord 39, such as for example, the wiring 41, are all short circuited together. Since each of the patch cords 44 and coaxial cables 26 are wired together through coaxial splitter 22, the portion of the building wiring circuit indicated as 48 shown in FIG. 1 is shorted together, forming an interior antenna within building 10. The shorting of that portion of the building wiring 48 together disables such wiring from being used for normal landline communications. Thus, building wiring 48 is a dedicated interior antenna. The remaining building wiring (not shown) is used for normal landline communications.

The coaxial cable/patch cord interface 24 further includes front cover plate 36, including a plurality of openings 38 for receiving jacks 32. Coaxial cable/patch cord interface 24 also includes rear cover plate 40 having a plurality of openings 42 therein for receiving N-type connectors 30. The front cover plate 36 and the rear cover plate 40 are affixed together. A plurality of patch cords 44, which are terminated on each end by RJ45 plugs (not shown), are connected between coaxial cable/patch cord interface 24 and standard patch panel 46, which exists in buildings which have communication wiring. One end of each patch cord 44 is connected to a corresponding jack 32 on coaxial cable/patch cord interface 24. The other end of each patch cord 44 is connected to a jack or port in patch panel 46 associated with building wiring which is not in use, such as the four building wiring circuits 48 illustrated in FIG. 1. Building wiring circuits 48 are normally in the form of twisted pair cables which are connected to wall outlets 50. The patch cords 44 and the already installed twisted pair cabling 48 will serve as an interior antenna for receiving and sending signals to and from cellular phone 52 which is used inside of building 10. The signals sent and received by cell phone 52 are captured and transmitted by patch cords 44 and building wiring 48 and travel through coaxial cable/patch cord interface 24, coaxial cables 26, coaxial splitter 20, coaxial cable 22, bi-directional amplifier 16, coaxial cable 18 and finally to and from antenna 14, which sends and receives wireless signals to and from a wireless transponder located remote from building 10. Since all of the conductors within patch cords 44 are effectively wired by coaxial cable/patch cord interface 24, it is believed that the antenna effect of patch cords 44 will be enhanced since the wires are effectively thicker, thereby reducing skin effect. The connections and apparatus located between interface 24 and wall outlets 50 form a second signal path. Coaxial splitter 20 is not needed if a single coaxial cable from coaxial cables 26 and a single patch cord from patch cords 44 are used for enabling the formation of the interior antenna.

This apparatus eliminates the need to place individual discrete antennas at wall outlets 50 and further eliminates the need to run coaxial cables from splitter 20 to the antennas associated with each of the wall outlets. The invention utilizes installed copper cabling base rather then installing new coaxial cables to improve cellular coverage in buildings, such as for example, in an office building. By using RF N-type connectors on one side of coaxial cable/patch cord interface 24 and RJ45 jacks on the other side, patch cords may be used to access installed structured cabling base. Since the patch cord connection on the patch panel 46 is selected so as to use a copper cabling in the walls of the building which are not in use, that cabling is used as antennas rather than transmission lines.

From the foregoing description of an embodiment of the invention, it will be apparent that many modifications may be made therein. It will be understood that this embodiment of the invention is an exemplification of the invention only and that the invention is not limited thereto. For example this invention could be used in other types of communication systems, such as, local area wireless networks, including networks governed by IEEE 802.11 wireless LANS, as well as two-way radio applications, and further including Wi-Fi, BlueTooth, and VHF.

While the invention has been described in terms of the above embodiments, those skilled in the art will recognize that the invention can be practiced with modification within the spirit and scope of the appended claims.

The invention claimed is:

1. An apparatus for enhancing wireless communications to and from the inside of a building comprising:

a first antenna associated with the building for sending and receiving wireless signals to and from a cell tower;

a first coaxial cable;

a bi-directional amplifier; the first coaxial cable connecting the first antenna to the bi-directional amplifier;

a second coaxial cable;

a coaxial splitter; the second coaxial cable connecting the bidirectional amplifier to the coaxial splitter;

a third coaxial cable and a fourth coaxial cable;

a coaxial cable/patch cord interface device; the interface device having at least first and second coaxial connectors and at least first and second jacks mounted thereon; the third coaxial cable connected to the first coaxial connector, and the fourth coaxial cable connected to the second coaxial connector; the third and fourth coaxial cables connecting the splitter to the interface device;

a first patch cord and a second patch cord;

a patch panel; the first patch cord connected to the first jack and the second patch cord connected to the second jack; the first and second patch cords connecting the interface device to the patch panel;

a wiring system associated with the building;

a plurality of wall outlets; the wiring system connecting the patch panel to the wall outlets; at least a portion of the wiring system forming a second antenna for sending and receiving wireless signals to and from wireless devices located within the building;

the portion of the wiring system which forms the second antenna being disabled from functioning as a portion of a wired communication system.

2. An apparatus as set forth in claim 1 wherein the first coaxial connector includes a signal contact; the first jack having a plurality of signal contacts; the plurality of signal contacts of the first jack connected together forming a short circuit; the signal contact of the first coaxial connector connected to the plurality of signal contacts of the first jack; the second coaxial connector having a signal contact; the second jack having a plurality of signal contacts; the plurality of signal contacts of the second jack connected together forming a short circuit; the signal contact of the second coaxial cable connected to the plurality of the signal contacts of the second jack.

3. An apparatus as set forth in claim 2 wherein the interface device is a circuit board; the connection of the plurality of signal contacts of the first jack formed by a trace on or in the circuit board; the connection of the plurality of signal contacts of the second jack formed by another trace in or on the circuit board.

4. An apparatus as set forth in claim 3, further including a plurality of coaxial connectors attached to one side of the circuit board; a plurality of jacks attached to the other side of the circuit board.

5. An apparatus as set forth in claim 4 wherein the interface device includes a first cover plate having a plurality of openings therein; at least a portion of the first cover place adjacent to one side of the circuit board; the plurality of openings in the first cover plate receiving the plurality of coaxial connectors; a second cover plate having a plurality of openings therein; at least a portion of the second cover plate adjacent to the other side of the circuit board; the plurality of openings in the second cover plate receiving the plurality of jacks.

6. An apparatus for enhancing wireless communications to and from the inside of a building comprising:

a first antenna associated with the building for sending and receiving wireless signals to and from a wireless signal transponder located remote from the building;

a signal path interface;

a first signal path between the first antenna and the signal path interface;

a wiring system associated with the building;

at least a second signal path between the signal path interface and the wiring system; at least a portion of the wiring system being a second antenna for sending and receiving wireless signals to and from wireless devices located within the building;

the portion of the wiring system which forms the second antenna is disabled from functioning as a portion of a wired communication system.

7. An apparatus as set forth in claim 6, further including a patch panel and a plurality of wall outlets being in the second signal path; at least one cable being in the second signal path and connecting the patch panel to at least one of the wall outlets; the cable being a part of the portion of the wiring system which forms the second antenna.

8. An apparatus as set forth in claim 6 wherein the signal path interface includes a circuit board; first and second connectors attached to the circuit board; the first connector being in the first signal path and the second connector being in the second signal path.

9. An apparatus for enhancing wireless communications to and from the inside of a building comprising:

a first antenna associated with the building for sending and receiving wireless signals to and from a wireless signal transponder located remote from the building;

a signal path interface;

a first signal path between the first antenna and the signal path interface;

a wiring system associated with the building;

at least a second signal path between the signal path interface and the wiring system; at least a portion of the wiring system being a second antenna for sending and receiving wireless signals to and from wireless devices located within the building;

the signal path interface includes a circuit board; first and second connectors attached to the circuit board; the first connector being in the first signal path and the second connector being in the second signal path;

the first connector includes a signal contact; the second connector having a plurality of signal contacts; the plurality of signal contacts in the second connector being connected together forming a short circuit; the signal contacts of the first connector being connected to each of the plurality of signal contacts of the second connector.

10. An apparatus as set forth in claim 9 wherein the short circuit of the plurality of signal contacts of the second connector and the connection of the signal contacts of the first connector to the plurality of signal contacts of the second connector is provided by a metal trace on or in the circuit board.

11. An apparatus as set forth in claim 9 wherein the first connector is a coaxial connector and the second connector is a jack.

12. An apparatus as set forth in claim 11 wherein said first signal path includes at least one coaxial cable; the second signal path including at least on patch cord.

13. An apparatus as set forth in claim 8, further including a plurality of first connectors attached to one side of the circuit board; a plurality of second connectors attached to the other side of the circuit board.

14. An apparatus as set forth in claim 13 wherein the signal path interface includes a first cover plate having a plurality of openings therein; at least a portion of the first cover plate being adjacent to one side of the circuit board; the plurality of openings in the first cover plate receiving the plurality of first connectors; a second cover plate having a plurality of openings therein; at least a portion of the second cover plate being adjacent to the second side of the circuit board; the plurality of openings in the second cover plate receiving the plurality of second connectors.

15. A method for enhancing wireless communications to and from the inside of a building comprising:

receiving a first wireless signal from a wireless transponder by first antenna;

amplifying the first signal received from the first antenna;

conveying the received first signal to a second antenna which includes at least a portion of a wiring system within the building;

sending the amplified first signal from the second antenna to a wireless device located within the building;

sending a second wireless signal from the wireless device;

receiving the second wireless signal by the second antenna;

amplifying the second signal received by the second antenna;

sending the amplified received signal to the first antenna;

sending the amplified second signal from the first antenna to the wireless transponder;

disabling the portion of the wiring system which forms the second antenna whereby the portion of the wiring system which forms the second antenna is dedicated for receiving and sending wireless signals.

16. A method as set forth in claim 15 wherein the portion of the wiring system within the building forming the second antenna, being a part of the wired communication system for the building.

* * * * *